United States Patent

Hamada

[11] Patent Number: 5,181,147
[45] Date of Patent: Jan. 19, 1993

[54] ROTARY HEAD ASSEMBLY FOR SUBSTANTIALLY CONCURRENT RECORDING AND MONITORING OF DATA ON A MAGNETIC TAPE CASSETTE OR THE LIKE

[75] Inventor: Toshihiko Hamada, Tokyo, Japan

[73] Assignee: Teac Corporation, Tokyo, Japan

[21] Appl. No.: 354,152

[22] Filed: May 19, 1989

[30] Foreign Application Priority Data

May 27, 1988 [JP] Japan .............................. 63-130547

[51] Int. Cl.$^5$ ...................... G11B 27/36; G11B 5/09; G11B 15/14
[52] U.S. Cl. ...................................... 360/31; 360/53; 360/64
[58] Field of Search ........................ 360/31, 53, 64, 47; 369/54, 58

[56] References Cited

U.S. PATENT DOCUMENTS

| | | | |
|---|---|---|---|
| 4,388,657 | 6/1983 | Hedlund et al. | 360/64 |
| 4,628,373 | 12/1986 | Takahashi et al. | 360/64 |
| 4,723,176 | 2/1988 | Ive | 360/31 |
| 4,740,847 | 4/1988 | Watanabe et al. | 360/64 |

OTHER PUBLICATIONS

JP Unexamined patent publication No. 62-177701, Aug. 4, 1987, "Rotary Head Type Magnetic Recording and Reproducing Apparatus".
IBM Technical Disclosure Bulletin, "Read/Write Servo Magnetic Head", D. R. McEfee, vol. 20, No. 9, Feb. 1978, pp. 3673-3674.

Primary Examiner—Aristotelis Psitos
Assistant Examiner—Won Tae C. Kim
Attorney, Agent, or Firm—Woodcock Washburn Kurtz Mackiewicz & Norris

[57] ABSTRACT

A rotary-head assembly for the storage and retrieval of digital data on and from a series of slanting record tracks on magnetic tape in cassette form or the like, with the capability of monitoring the recording being written on the tape. The rotary-head assembly includes a rotary drum to which there are mounted first and second magnetic read/write heads and first and second magnetic monitor heads. The two read/write heads alternately scan the magnetic tape for creating a series of slanting record tracks on the magnetic tape. For monitoring the data being written by the first and second read/write heads, the first and second monitor heads scan only parts of the widths of the record tracks created by the first and second read/write heads, respectively. The output signals of the monitor heads are therefore less in amplitude than if they scanned the full widths of the record tracks. If these signals are found satisfactory, as by a computer of which the magnetic tape apparatus forms a part, then it follows that the data is being recorded with a sufficient quality margin to overcome subsequent self-demagnetization.

6 Claims, 3 Drawing Sheets

ROTARY HEAD ASSEMBLY FOR SUBSTANTIALLY CONCURRENT RECORDING AND MONITORING OF DATA ON A MAGNETIC TAPE CASSETTE OR THE LIKE

BACKGROUND OF THE INVENTION

My invention relates to a magnetic tape apparatus of the type having a rotary head assembly for reading, writing, and monitoring data on magnetic tape. More particularly, my invention pertains to the improved arrangement of read/write heads and monitor heads included in the rotary head assembly. Typically, the apparatus according to my invention represents an adaptation of a digital audio tape (DAT) deck for the storage and retrieval of digitized data on the DAT, with a read-after-write monitoring capability, for use as part of a computer system.

Japanese Unexamined Patent Application No. 62-177701, laid open to public inspection on Aug. 4, 1987, represents an example of known rotary-head magnetic read/write system providing for substantially concurrent recording and monitoring of digital data on a DAT cassette. It teaches the use of a rotary head assembly including a rotary drum to which there are mounted not only a pair of read/write heads but also a pair of monitor heads. The pair of read/write heads are disposed in diametrically opposite positions on the rotary drum. The pair of monitor heads are also disposed in diametrically opposite positions on the drum. An angular difference of 90 degrees exists between the positions of the two pairs of heads. The magnetic tape is wrapped around the rotary head assembly through an angle of, typically, 90 degrees.

In this prior art system, as the read/write heads create a series of slanting record tracks on the tape, the monitor heads substantially concurrently scan the tracks for monitoring the recorded data. In event the output signals of the monitoring heads indicate that data is not being recorded properly, the host computer commands the rewriting of the data.

There has been a problem left unsolved in connection with such a rotary-head DAT (R-DAT) system having a substantially concurrent monitoring capability. In R-DAT systems in general, the pair of read/write heads alternately form tracks so as to overlap the preceding track. Such "overwriting" results in the creation of record tracks of reduced width. However, since the monitor heads scan the tracks before they are overwritten, the record tracks eventually formed by overwriting are narrower than those scanned by the monitor heads.

Admittedly, the prior art R-DAT system enables the evaluation of the quality of the recording on the tracks before overwriting. The monitor heads have so far been so arranged on the rotary drum as to scan the complete width of the tracks as formed by the read/write heads. For this same reason, however, the prior art system has often failed to ascertain whether the data has been recorded on the overwritten tracks with a sufficient quality margin or not. This shortcoming can bring about serious consequences because, as is well known, the intensity of the recording on magnetic tape decreases from about five to fifteen percent with the lapse of time through self-demagnetization. Therefore, if the data on magnetic tape is to be monitored substantially concurrently with writing, it is essential to make sure that the quality margin of the recording on the overwritten tracks is sufficient to overcome the self-demagnetization.

SUMMARY OF THE INVENTION

I have hereby invented how to accurately monitor digital data being recorded on a DAT cassette or the like, in order to assure a sufficient quality margin of the recording in the face of its unavoidable loss of strength through self-demagnetization.

Briefly, my invention may be summarized as a magnetic tape apparatus of the type having a rotary head assembly for the storage and retrieval of digital data on and from a series of slanting record tracks on magnetic tape such as that in the form of a cassette. More specifically, my invention concerns the novel configuration of the rotary head assembly. The rotary head assembly comprises a first and a second read/write head mounted to a rotary drum for reading and writing data on the magnetic tape. The first and second read/write heads alternately scan the magnetic tape for creating a series of slanting record tracks thereon. Also mounted to the rotary drum are a first and a second monitor head for monitoring the data written on the magnetic tape by the first and second read/write heads, respectively. The first monitor head scans part, instead of all as in the prior art, of the width of each record track created by the first read/write head. The second monitor head scans part, instead of all as in the prior art, of the width of each record track created by the second read/write head.

Typically, the magnetic tape apparatus of my invention finds use in a digital computer system, with a DAT cassette employed as a data storage medium. The monitoring of the recording on the DAT cassette is under computer control. As the monitor heads scan only parts of the widths of the record tracks created by the read/write heads, the output signals of the monitor heads are less in amplitude than if they scanned the complete widths of the record tracks. If the computer accepts the reduced amplitude signals of the monitor heads, it follows that the data recorded in the full widths of the record tracks have a sufficient quality margin to overcome subsequent deterioration in strength through self-demagnetization.

The above and other features and advantages of my invention and the manner of realizing them will become more apparent, and the invention itself will best be understood, from a study of the following description and appended claims, with reference had to the attached drawings showing some preferred embodiments of my invention.

DESCRIPTION OF THE PREFERRED EMBODIMENTS

Figure 1:
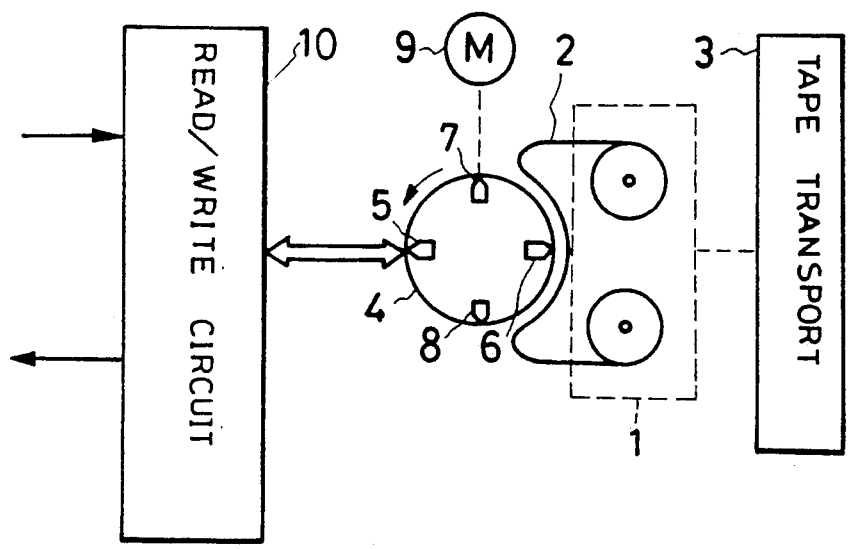
FIG. 1 is a schematic diagram, partly in block form, of the R-DAT system embodying the principles of my invention.

I will now describe my invention in detail as embodied in an R-DAT deck adapted for use as part of a computer system. As diagrammatically illustrated in FIG. 1, the R-DAT deck is for use with a replaceable DAT cassette 1 having a length of magnetic tape 2. The R-DAT deck is equipped with a tape transport 3 for transporting the tape 2 from hub to hub past a rotary drum 4. The tape transport 3 comprises a motor-driven capstan, a pinch roller, and a pair of hub motors, which are all not shown because of their conventional nature.

Mounted to the rotary drum 4 are first 5 and second 6 magnetic read/write heads and first 7 and second 8 magnetic monitor heads. The rotary drum 4 and the four magnetic heads 5–8 thereon constitute in combination a rotary head assembly. The read/write heads 5 and 6 are angularly spaced 180 degrees from each other, and so are the monitor heads 7 and 8. An angular difference of approximately 90 degrees exists between the positions of the read/write heads 5 and 6 and the monitor heads 7 and 8. These monitor heads scan the record tracks immediately as they are formed by the read/write heads 5 and 6 on the magnetic tape 2. An electric drum motor 9 is drivingly coupled to the rotary drum 9. The read/write heads 5 and 6 and the monitor heads 7 and 8 are all electrically connected to a read/write circuit 10. This read/write circuit is conventionally under the control of a host computer. I have not shown the host computer as it falls outside the scope of my invention.

Figure 2:
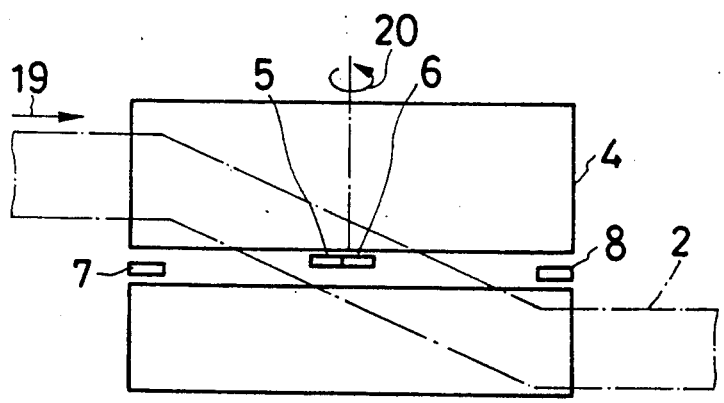
FIG. 2 is a diagrammatic illustration explanatory of the positional relationship between the rotary head assembly and the magnetic tape traveling past the same in the R-DAT system of FIG. 1.
Figure 3:
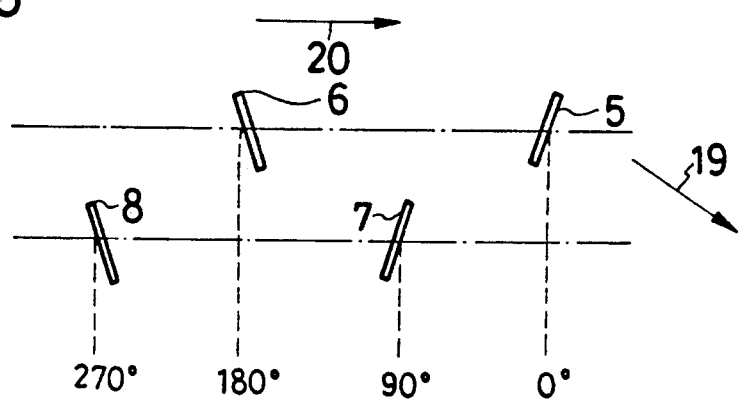
FIG. 3 is a developed view explanatory of the angular and axial positions of the read/write heads and monitor heads on the rotary head in the rotary head assembly of FIG. 2.

FIG. 2 is explanatory of the positional relationship between the four heads 5–8 on the rotary drum 4 and the magnetic tape 2 extending past the drum. FIG. 3 is explanatory of the positional relationship among the four heads 5–8. In these figures the arrow 19 indicates the direction of tape travel, and the arrow 20 the direction of the revolution of the heads 5–8 with the rotary drum 4.

As will be noted from FIGS. 2 and 3, there must necessarily be a certain difference between the axial positions of the read/write heads 5 and 6 and those of the monitor heads 7 and 8 on the rotary drum 4 in order to enable the monitor heads to scan the record tracks being formed by the read/write heads. My invention proposes that there be a greater difference between the axial positions of the two pairs of heads than that required of necessity. I will later explain such a difference in more detail.

Figure 4:
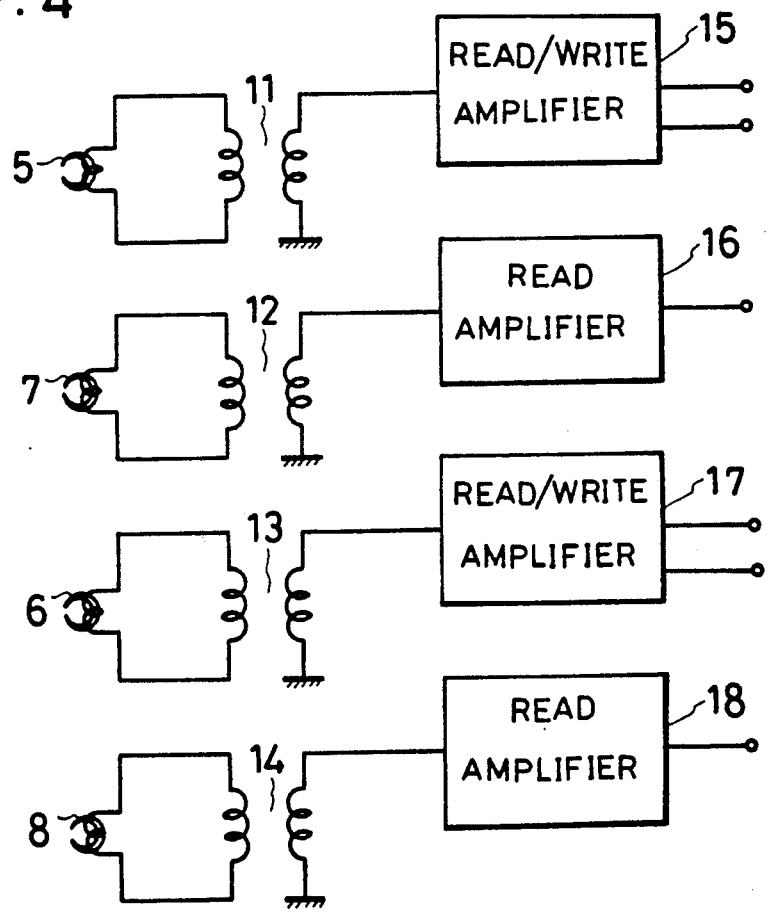
FIG. 4 is a schematic electrical diagram of the read/write heads and monitor heads and their input/output circuit means.

As illustrated in FIG. 4, the read/write heads 5 and 6 are connected to read/write amplifiers 15 and 17 via rotary transformers 11 and 13, respectively. The monitor heads 7 and 8 are connected to read amplifiers 16 and 18 via rotary transformers 12 and 14, respectively.

Figure 5:
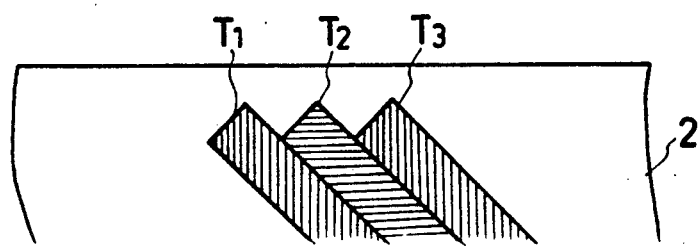
FIG. 5 is a partial diagrammatic illustration of the magnetic tape and the slanting record tracks formed thereon.

FIG. 5 is an illustration of a series of slanting record tracks $T_1$, $T_2$, $T_3$, ... formed on the magnetic tape 2 by the read/write heads 5 and 6. The first read/write head 5 creates the record tracks $T_1$, $T_3$, etc., and the second read/write head 6 creates the record track $T_2$, etc., as the magnetic tape 2, conventionally wrapped around the rotary drum 4, travels in the direction of the arrow 19 and as the read/write heads 5 and 6 revolve in the direction of the arrow 20. All the record tracks are disposed contiguously by overwriting. There is practically no fear of crosstalk, however, because the gaps in the two read/write heads 5 and 6 have different azimuths.

Figure 6:
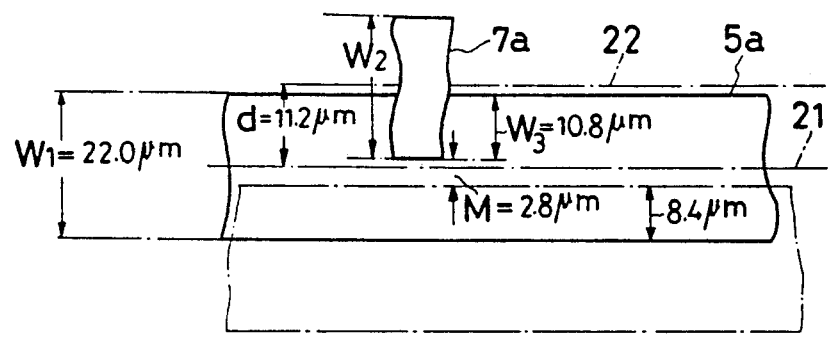
FIG. 6 is a partial diagrammatic illustration explanatory of the positional relationship between the scanning tracks of one of the read/write heads and one of the monitor heads.

FIG. 6 shows a lateral offset of the scanning track 7a of the first monitor head 7 with respect to the scanning track 5a of the first read/write head 5 in accordance with my invention. The width $W_2$ of the scanning track 7a of the first monitor head 7 is the same with the width $W_1$ of the scanning track 5a of the first read/write head 5. However, the centerline 22 of the scanning track 7a is offset a difference d from the centerline 21 of the scanning track 5a. Consequently, the scanning track 7a of the first monitor head 7 laps over the scanning track 5a of the first read/write head 5 a distance $W_3$ which is less than the width $W_1$ of the scanning track 5a. The monitor head 7 reads the recording only on this lateral part $W_3$ of the scanning track 5a of the read/write head 5. I understand that the scanning track of the second monitor head 8 is likewise offset laterally with respect to the scanning track of the second read/write head 6.

Thus the monitor heads 7 and 8 scans only lateral parts of the tracks formed by the read/write heads 5 and 6, respectively. The resulting output amplitudes of the monitor heads 7 and 8 are therefore less than if, as has been the case heretofore, they scanned the complete widths of the record tracks. If the unshown computer accepts the reduced amplitude outputs of the monitor heads 7 and 8 as satisfactory, it follows that the recording on the overwritten tracks has a sufficient quality margin to overcome subsequent deterioration through self-demagnetization.

Figure 7:
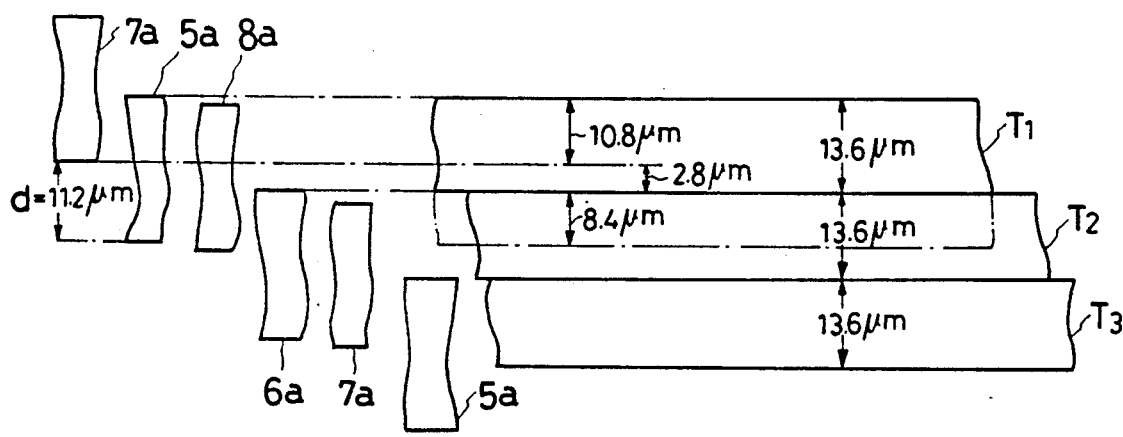
FIG. 7 is a partial diagrammatic illustration explanatory of the positional relationship among the overwritten record tracks, the scanning tracks of the read/write heads, and those of the monitor heads.

According to my invention the centerlines of the scanning tracks of the monitor heads 7 and 8 are laterally offset from the centerlines of the overwritten record tracks $T_1$, $T_2$, $T_3$, ..., too. Reference may be had to both FIGS. 6 and 7 for the following discussion of such lateral offset of the monitor heads 7 and 8 with respect to the read/write heads 5 and 6.

In R-DAT systems in general, the read/write heads 5 and 6 have each a scanning width $W_1$ of 22.0 micrometers, with an overlap of 8.4 micrometers between the adjacent tracks. Accordingly, the record tracks $T_1$, $T_2$, $T_3$, ... eventually formed by overwriting have each a width, or track pitch, of 13.6 micrometers. The lateral offset d of the scanning tracks 7a and 8a of the monitor heads 7 and 8 with respect to the scanning tracks 5a and 6a may be set at, for example, 11.2 micrometers in order to enable the monitor heads to read the recording on the overwritten record tracks $T_1$, $T_2$, $T_3$, ... That part $W_3$ of the scanning track 5a (or 6a) of the first read/write head 5 (or second read/write head 6) which is actually scanned by the first monitor head 7 (or second monitor head 8) is therefore 10.8 micrometers. Since the overwritten record tracks $T_1$, $T_2$, $T_3$, ... have each a width of 13.6 micrometers as aforesaid, each monitor head scans 79.4 percent of each overwritten record track, leaving a margin M of 20.6 percent or 2.8 micrometers.

The expected loss in strength of the recording by self-demagnetization and other reasons is from five to fifteen percent. I recommend that the margin M be from 15 to 30 percent (2.04 to 4.08 micrometers) in consideration of the expected loss in strength of the recording. The centerline 22 of the scanning tracks 7a and 8a of the monitor heads 7 and 8 may therefore be laterally offset a distance d of, preferably, 10.44 to 12.48 micrometers from the centerline 21 of the scanning tracks 5a and 6a of the read/write heads 5 and 6. At any event the lateral offset d should not exceed 13.6 micrometers. For, should the lateral offset exceed that limit, the monitor head 7 or 8 would read an additional track created by the read/write head 5 or 6 of the same azimuth. For example, while reading the track $T_3$ formed by the first read/write head 5 in FIG. 7, the first monitor head 7 would read the track $T_1$, too, which also has been created by the first read/write head 5.

Of course, for monitoring after overwriting, the first monitor head 7 scans the track $T_2$, too, while scanning the track $T_3$. However, the azimuth of the first monitor head 7 is inverse to that of the second read/write head 6. The first monitor head 7 is therefore substantially incapable of reading the track $T_2$ created by the second read/write head 6. The same applies to the second monitor head 8 with respect to the tracks created by the first read/write head 5.

ALTERNATIVE FORM

Figure 8:
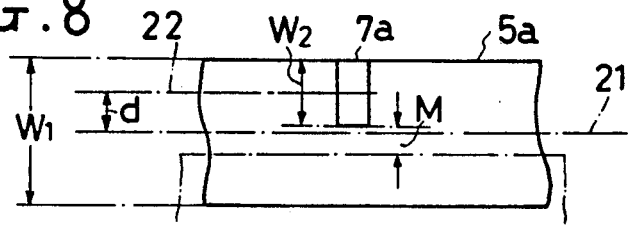
FIG. 8 is a partial diagrammatic illustration explanatory of an alternative positional relationship between the scanning tracks of one of the read/write heads and one of the monitor heads.

The scanning width $W_2$ of the monitor heads 7 and 8 may not necessarily be the same as the scanning width $W_1$ of the read/write heads 5 and 6 for the purposes of my invention. Thus, in FIG. 8, the width $W_2$ of the scanning track 7a of the first monitor head 7 is made less than the width $W_1$ of the scanning track 5a of the first read/write head 5. The centerline 22 of the scanning track 7a is offset a distance d from the centerline 21 of the scanning track 5a. It is understood, of course, that the same relationship exists between the scanning tracks of the second read/write head 6 and the second monitor head 8. In this manner, too, the monitor heads 7 and 8 scan only parts of the tracks formed by the read/write heads 5 and 6 in accordance with the teachings of my invention.

Despite the foregoing detailed disclosure, I do not wish my invention to be limited by the exact details of the illustrated embodiments. A variety of modifications or adaptations of my invention will occur to the specialists without departing from the scope of the following claims.

What I claim is:

1. A magnetic tape apparatus of the type having a rotary heat assembly for the storage and retrieval of digital data on and from a series of slanting record tracks on magnetic tape, wherein the improvement resides in the rotary head assembly comprising:
   a) a rotary drum;
   b) a first read/write head mounted on the rotary drum for reading and writing data on the magnetic tape;
   c) a second read/write head mounted on the rotary drum for reading and writing data on the magnetic tape, the second read/write head being angularly spaced 180 degrees from the first read/write head, the first and second read/write heads alternately scanning the magnetic tape for creating a series of slanting record tracks thereon;
   d) a first monitor head mounted on the rotary drum for monitoring the data written on the magnetic tape by the first read/write head, the first monitor head being angularly disposed between the first read/write head and the second read/write head, the first monitor head and the first read/write head being positioned relative to one another such that the first monitor head scans a lateral portion of the width of each record track created by the first read/write head, the lateral portion being less than the reduced width of the record track after overlapping by an adjacent record track; and
   e) a second monitor head mounted on the rotary drum for monitoring the data written on the magnetic tape by the second read/write head, the second monitor head being angularly disposed between the first read/write head and the second read/write head, the second monitor head and the second read/write head being positioned relative to one another such that the second monitor head scans a lateral portion of the width of each record track created by the second read/write head, the lateral portion being less than the reduced width of the record track after overlapping by an adjacent record track;
   f) whereby the output signals of the first and second monitoring heads are less in amplitude than if they scanned the complete widths of the record tracks.

2. The invention of claim 1 wherein the first and second monitor heads have each substantially the same scanning width as each of the first and second read/write heads, wherein the centerline of the scanning track of the first monitor head is offset from the centerline of the scanning track of the first read/write head, and wherein the centerline of the scanning track of the second monitor head is offset from the centerline of the scanning track of the second read/write head.

3. The invention of claim 2 wherein the centerlines of the scanning tracks of the first and second monitor heads are each offset from about 10.44 to 12.48 micrometers from the centerlines of the scanning tracks of the first and second read/write heads, respectively.

4. The invention of claim 2 wherein each monitor head is mounted on the rotary drum so as to scan from 70 to 85 percent of the width of each record track.

5. The invention of claim 1 wherein the first and second monitor heads have each a scanning width less than the scanning width of each of the first and second read/write heads, and wherein the centerlines of the scanning tracks of the first and second monitor heads are laterally offset from the centerlines of the scanning tracks of the first and second read/write heads, respectively.

6. The invention of claim 5 wherein each monitor head is mounted on the rotary drum so as to scan from 70 to 85 percent of the width of each record track.

* * * * *